US005420423A

United States Patent [19]

Linden

[11] Patent Number: 5,420,423

[45] Date of Patent: May 30, 1995

[54] MASS SPECTROMETER FOR TIME DEPENDENT MASS SEPARATION

[76] Inventor: H. Bernhard Linden, Auf dem Berge 25, D-28844 Leeste/Weyhe, Germany

[21] Appl. No.: 198,112

[22] Filed: Feb. 17, 1994

[30] Foreign Application Priority Data

Feb. 23, 1993 [DE] Germany ........................ 43 05 363.7

[51] Int. Cl.[6] ........................ B01D 59/44; H01J 49/00

[52] U.S. Cl. ........................ 250/281; 250/290

[58] Field of Search ............... 250/281, 287, 294, 295, 250/290

[56] References Cited

U.S. PATENT DOCUMENTS 3,309,517 3/1967 Liot ........................ 250/294
3,407,323 10/1968 Hand ........................ 313/63
3,953,732 4/1976 Oron et al. ........................ 250/287
4,472,631 9/1984 Enke et al. ........................ 250/287
4,831,254 5/1989 Jenkins ........................ 250/287
5,091,645 2/1992 Elliott ........................ 250/294
5,194,732 3/1993 Bateman ........................ 250/294
5,198,666 3/1993 Bateman ........................ 250/294

*Primary Examiner*—Bruce C. Anderson
*Attorney, Agent, or Firm*—Rodgers & Rodgers

[57] ABSTRACT

Ion packets of different masses are dispersed according to their mass-to-charge-ratio by dispersion electrodes by means of deflection voltages continuously varying between free selectable start and end values as a function of time with adjustable voltage gradients such that voltages varying with a suited function of time make the mass window of the dispersed ion packets visible at the detector and independent of the analyzed masses. The mass resolution increases with the masses.

12 Claims, 1 Drawing Sheet

MASS SPECTROMETER FOR TIME DEPENDENT MASS SEPARATION

BACKGROUND OF THE INVENTION

The invention relates to a time-of-flight mass spectrometer with deflection electrodes and a micro-channel-plate detector system. The mass determination of the known time-of-flight mass spectrometers is accomplished by measurement of the individual flight times of the ions of different masses.

The deflection electrodes of such time-of-flight mass spectrometers can deflect only a whole mass range without regard for the mass-to-charge ratio of the ions. All ions passing the deflection electrodes as long as the deflection potential is switched on are deflected, don't reach the detector, and are prevented from being analysed. Ions passing the deflection electrodes during the deflection potential is switched off, can travel straight towards the detector and are analysed by determination of their flight times. The resolution of such time-of-flight mass spectrometers is limited to a few thousand for low mass ions down to a few hundred for heavy ions.

Several other types of mass spectrometers are known with higher resolution: Ion-cyclotron-resonance mass spectrometers exhibit a resolution of up to 100 million or more. Magnetic sector mass spectrometers have a resolution of approx. 10 to 150 thousand. That one of quadrupole type mass spectrometers is approx. 1 to 20 thousand. But all these types of mass spectrometers are unable to analyse masses of 50'000 dalton or above.

The time-of-flight mass spectrometers have the capability to analyse masses as high as up to several 100'000 dalton. The resolution of time-of-flight mass spectrometers is poor as compared with the other mass spectrometer types and decreases with increasing masses. There is no mass spectrometer able to resolve heavy biomolecules, genetic engineering products, and other high mass samples with a desirable high resolution.

DESCRIPTION OF THE INVENTION

It is an object of the present invention to provide an improved mass spectrometer with high resolution mass separation by means of a time dependent dispersion of the ions of different masses according to their mass-to-charge-ratio.

In accordance with the preferred embodiment of the invention, ion packets of different masses are dispersed according to their mass-to-charge-ratio by dispersion electrodes by means of continuously rising and/or falling deflection voltages varying between free selectable start and end values as a function of time with adjustable voltage gradients such a way that the masses are determined by the position at which the ions hit the detector surface independent of the mass determination of the ions by their respective flight times.

Thus ions arriving at the detector after each other, don't hit the detector surface at the same position but are individually deflected according to their mass-to-charge-ratios resulting in a position resolved mass spectrum. With suited time functions of the deflection voltages, the distances of the arrival positions of subsequent masses can be kept constant over the whole mass range whereas their flight time differences decrease with increasing masses. The resolution of the mass spectrum given by the respective arrival positions of the ions, depends on the gradient of the deflection voltages but not on the investigated mass range. Thus the resolution increases with the mass.

DESCRIPTION OF THE DRAWINGS

Proceeding now to the detailed description of the drawings, FIG. 1 illustrates the mass spectrometer with flight tube 1. At one end of the flight tube 1 is the channel plate detector 2 and at the other end is the ion source 7. The dispersion electrodes 3 and 4 are positioned between the ion source 7 and the detector 2. The electrodes 5 and 6 are placed close to the dispersion electrodes 3 and 4, designed as aperture lenses and shield of the electrical fields.

Figure 1:
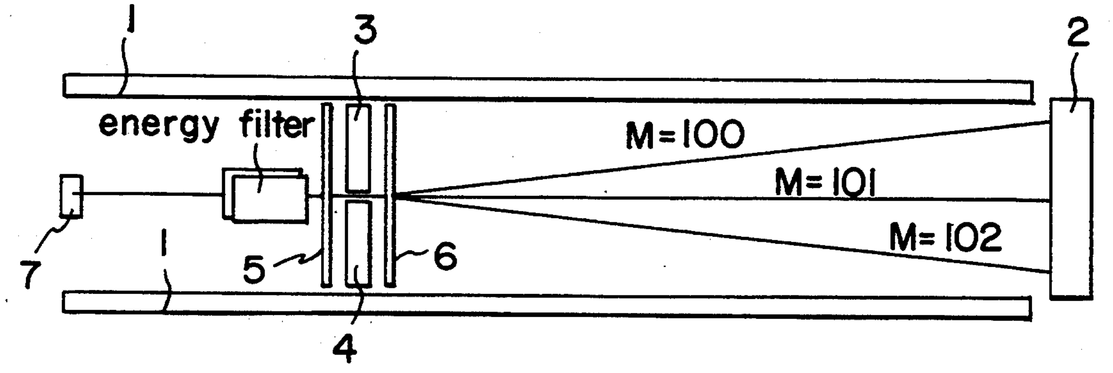
FIG. 1 is a schematic view of the mass spectrometer including the ion paths of several dispersed masses.

Ion packets travelling from the ion source 7 with a kinetic energy of e.g. 1000 eV towards the detector 2, can pass through the shielding electrodes 5 and 6 and the gap between the dispersion electrodes 3 and 4. Depending on the voltages supplied to the dispersion electrodes 3 and 4, the ions can be dispersed. If the dispersion electrodes 3 and 4 have identical potentials e.g. zero Volt, all ions can travel straight without any deflection. If they have static asymmetric potentials e.g. electrode 3 having +150 Volt and electrode 4 having −150 Volt, all ions are deflected without respect to their mass-to-charge-ratios.

Turning now to dynamic deflection voltages continuously varying as a function of time, supplied either to one of the dispersion electrodes e.g. electrode 4 with the other dispersion electrode 3 kept constant, or supplied asymmetrically e.g. by voltages of opposite signs to the electrodes 3 and 4, ions of different masses penetrating the gap between the dispersion electrodes 3 and 4 after each other, are dispersed according to their mass-to-charge-ratios due to the continuously varying voltages of the electrodes 3 and/or 4. Thus the dispersed ions are deflected differently and arrive at different positions at the channel plate detector 2. An advantageous time function of the deflection voltage is composed of a dynamic and a static part according to the equation:

$$U(t) = U_{dyn} - U_{stat} \qquad \text{equation 1}$$

with $U(t)$=deflection voltage as a function of time $U_{dyn}$=dynamic part of the deflection voltage $U_{stat}$=static part of the deflection voltage The dynamic part of the deflection voltage can preferably vary with the square of the time. Further the dynamic part of the deflection voltage can be delayed with respect to the start time of the ion packets according to the equation:

$$U_{dyn} = (t^2 - t_{delay}) \times U_{deflect} \qquad \text{equation 2}$$

with $t$=time beginning with the start of the ion packets $t_{delay}$=adjustable delay $U_{deflect}$=gradient of the deflection voltage $U_{dyn}$ of equation 1 can be substituted by equation 2 yielding:

$$U(t) = (t^2 - t_{delay}) \times U_{deflect} - U_{stat} \qquad \text{equation 3}$$

A mass dispersion depending on the flight time can be achieved with a deflection voltage according to equation 3 supplied to one of the dispersion electrodes 3 or 4 with the respective other one kept constant. A more efficient mass dispersion results from deflection voltages of opposite signs supplied to both electrodes, e.g. +U(t) supplied to electrode 3 and −U(t) supplied to electrode 4. The time-of-flight mass spectrometry knows the equation:

$$t^2 = c \times M(t)/U$$ mentioned here as equation 4 with

M(t)=ions mass determined by the flight time
U=acceleration voltage of the ions
c=constant of the apparatus Substituting equation 4 into equation 3 and rearranging gives:

$$M(t) = [(U(t) + U_{stat})/U_{deflect} + t_{delay}] \times U/c \quad \text{equation 5}$$

At U(t)=0, both dispersion electrodes 3 and 4 have a voltage of zero Volt. For ions penetrating the gap between the dispersion electrodes 3 and 4 at that time, equation 5 is simplified to:

$$M_{straight} = (U_{stat}/U_{deflect} + t_{delay}) \times U/c \quad \text{equation 6}$$

with $M_{straight}$=Mass of ions travelling straight without deflection

Equation 6 determines the mass of the ions arriving at the middle of the detector 2. The mass deflected by the distance +y from the middle of the detector 2 can be calculated from equation 5:

$$M(t_{-y}) = [(U(t_{+y}) + U_{stat})/U_{deflect} + t_{delay}] \times U/c \quad \text{equation 7}$$

A mass deflected from the middle by the distance −y can be calculated from equation 5:

$$M(t_{-y}) = [(U(t_{-y}) + U_{stat})/U_{deflect} + t_{delay}] \times U/c \quad \text{equation 8}$$

The time dependent voltages for deflection of $M(t_{+y})$ and $M(t_{-y})$ have the same amount but have opposite signs. $U_{stat}$, $U_{deflect}$, $t_{delay}$, U, and c are constant within one and the same spectrum. Therefore subtracting equations 7 and 8 from each other gives for a visible mass window from $M(t_{+y})$ to $M(t_{-y})$:

$$M_{window} \times U_{deflect} = \text{constant} \quad \text{equation 9}$$

with $M_{window}$=mass window from $M(t_{+y})$ through $M(t_{-y})$

The fundamental equation 9 shows that the mass window detectable at the channel plate detector 2, is independent of the mass but depends on the voltage gradient of the invented mass spectrometer. With the detectable mass window being independent of the investigated mass range, proceeding from low to high masses represents a zoom-effect coincident with a increasing resolution towards higher masses. This is an important advantage as compared to most other mass spectrometers especially the known time-of-flight mass spectrometers the resolution of which decreases with increasing masses.

The spread of the kinetic energy of the ion source can be compensated for by an energy filter as known from other mass spectrometers. The energy filter isn't shown in FIGS. 1 and 2. The energy filter electrodes have to be positioned above and below the drawing plane.

Figure 2:
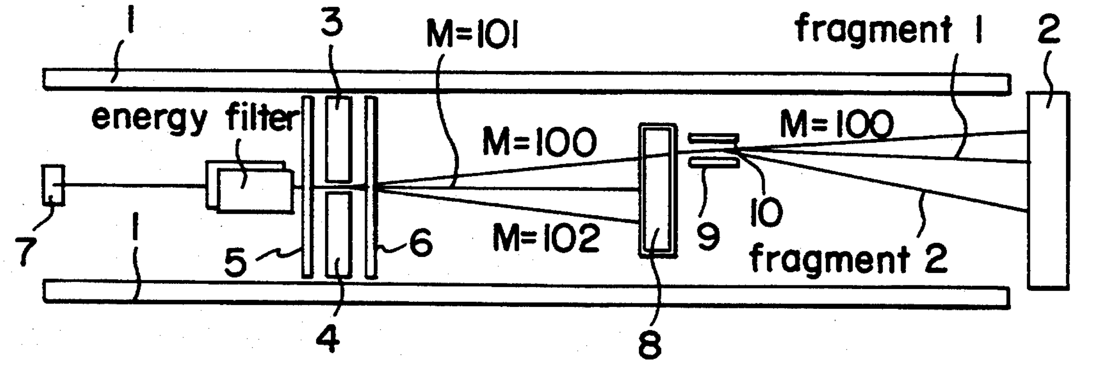
FIG. 2 is a similar schematic view with a modification for additional analysis of fragment ions.

FIG. 2 shows a modification for additional multiple MS/MS-analysis of precursor and fragment ions. The known fragmentation means 8 e.g. a gass collision cell is introduced between the shielding electrode 6 and the detector 2. Precursor ions selectable by a suited time function of the deflection voltages of the dispersion electrodes 3 and 4, in this case acting as the first MS-stage, are cracked by the fragmentation means 8. Analysis of the fragment ions leaving the fragmentation means 8 with the same velocity and in the same direction as the precursor ions, is performed by means of the separation electrodes 9 and 10 according to the mass-to-charge-ratios of the respective fragment ions including the not cracked precursor ions. The electrodes 9 and 10 act as the second MS-stage.

Several sets of fragmentation means 8 and separation electrodes 9 and 10 can be arrayed after each other for consecutive analysis of the product ions of repeated fragmentations.

What is claimed is:

1. Mass Spectrometer with time dependent mass separation with a channel plate detector and deflection electrodes comprising dispersion electrodes to which continuously rising and/or falling deflection voltages are supplied with adjustable voltage gradients between selectable start and end values such a way that ions passing the dispersion electrodes are dispersed according to their mass-to-charge-ratio resulting in a mass determination by means of measurement of the respective deflection distances measured at the surface of the detector as the distance of respective spots of deflected particles from the spots of not deflected ones.

2. Mass Spectrometer as in claim 1, the deflection voltages being composed of a static and a dynamic fraction.

3. Mass Spectrometer as in claim 2, the dynamic fraction of the deflection voltages ensuing from the equation $$U(t) = (t^2 - t_{delay}) \times U_{deflect} - U_{stat}$$

where U(t) is the deflection voltage of the dispersion electrodes as a function of time, t is the elapsed time from the start of the particles, $t_{delay}$ is an adjustable delay, $U_{deflect}$ is the gradient of the dynamic deflection voltage, and $U_{stat}$ is the static part of the deflection voltage.

4. Mass Spectrometer as in claim 1, several dispersion electrodes being arranged along the ion flight path.

5. Mass Spectrometer as in claim 4, the dispersion electrodes being supplied with deflection voltages of opposite signs.

6. Mass Spectrometer as in claim 1, the dynamic portion of the deflection voltages being proportional to the time.

7. Mass Spectrometer as in claim 1, the dynamic portion of the deflection voltages starting delayed.

8. Mass Spectrometer as in claim 1, the mass appearing in the middle of the detectable spectrum ensuing from the equation $$M_{straight}=(U_{stat}/U_{deflect}+t_{delay})\times U/c$$

where $M_{straight}$ is the not deflected mass, $U_{stat}$ is the static part of the deflection voltage, $U_{deflect}$ is the gradient of the deflection voltage, $t_{delay}$ is an adjustable delay, U is the acceleration voltage of the particles, and c is a constant instrument factor.

9. Mass Spectrometer as in claim 1, and including an energy filter means perpendicular to the dispersed ion beam.

10. Mass Spectrometer as in claim 1, the local resolution of the detectable mass window being independent of the mass range ensuing from the equation $$M_{window}\times U_{deflect}=constant$$

where $M_{window}$ is the mass window visible at the detector and $U_{deflect}$ is the gradient of the deflection voltage.

11. Mass Spectrometer as in claim 1, and including fragmentation means and separation electrodes.

12. Mass Spectrometer as in claim 1, and including several sets of fragmentation means and separation electrodes.

* * * * *